(12) United States Patent
Takemoto

(10) Patent No.: US 11,031,780 B2
(45) Date of Patent: Jun. 8, 2021

(54) ELECTRIC POWER SUPPLYING DEVICE

(71) Applicant: TOYOTA JIDOSHA KABUSHIKI KAISHA, Toyota (JP)

(72) Inventor: Taiki Takemoto, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/815,167

(22) Filed: Mar. 11, 2020

(65) Prior Publication Data
US 2020/0358286 A1 Nov. 12, 2020

(30) Foreign Application Priority Data

May 10, 2019 (JP) ............................. JP2019-090043

(51) Int. Cl.
*H02J 1/12* (2006.01)
*H02M 3/158* (2006.01)
*B60L 1/00* (2006.01)
*H02J 1/10* (2006.01)

(52) U.S. Cl.
CPC .................. *H02J 1/12* (2013.01); *B60L 1/00* (2013.01); *H02J 1/102* (2013.01); *H02J 1/106* (2020.01); *H02M 3/1584* (2013.01); *B60L 2210/12* (2013.01); *H02J 2310/48* (2020.01)

(58) Field of Classification Search
CPC .......... H02J 1/10; H02M 3/285; H02M 3/158; H02M 3/1584; B60L 1/00; B60L 2210/10; B60L 2210/12
See application file for complete search history.

(56) References Cited

U.S. PATENT DOCUMENTS

| | | | |
|---|---|---|---|
| 6,396,720 B1 | 5/2002 | Gronbach | |
| 9,421,867 B2* | 8/2016 | Sakurai | ............... B60L 15/2045 |
| 9,849,793 B2* | 12/2017 | Tashiro | ................... B60L 58/25 |
| 2013/0099559 A1 | 4/2013 | Machi et al. | |
| 2015/0180342 A1 | 6/2015 | Yang et al. | |
| 2015/0222191 A1 | 8/2015 | Hosoda et al. | |
| 2015/0229218 A1 | 8/2015 | Hosoda | |

FOREIGN PATENT DOCUMENTS

| | | |
|---|---|---|
| GB | 2482486 A | 2/2012 |
| JP | 2013-090517 A | 5/2013 |
| JP | 5387651 B2 | 1/2014 |

* cited by examiner

*Primary Examiner* — Ryan Johnson
(74) *Attorney, Agent, or Firm* — Oliff PLC

(57) ABSTRACT

An electric power supplying device including: a first sensing section that senses a first output current from a first DCDC converter provided between a high-voltage system and an auxiliary device system; a second sensing section that senses a second output current from a second DCDC converter provided between the high-voltage system and the auxiliary device system; a third sensing section that senses a third output current from an auxiliary device battery connected to the auxiliary device system; and a control section that controls output of the second DCDC converter on the basis of results of sensing of output currents by the first sensing section, the second sensing section and the third sensing section.

5 Claims, 7 Drawing Sheets

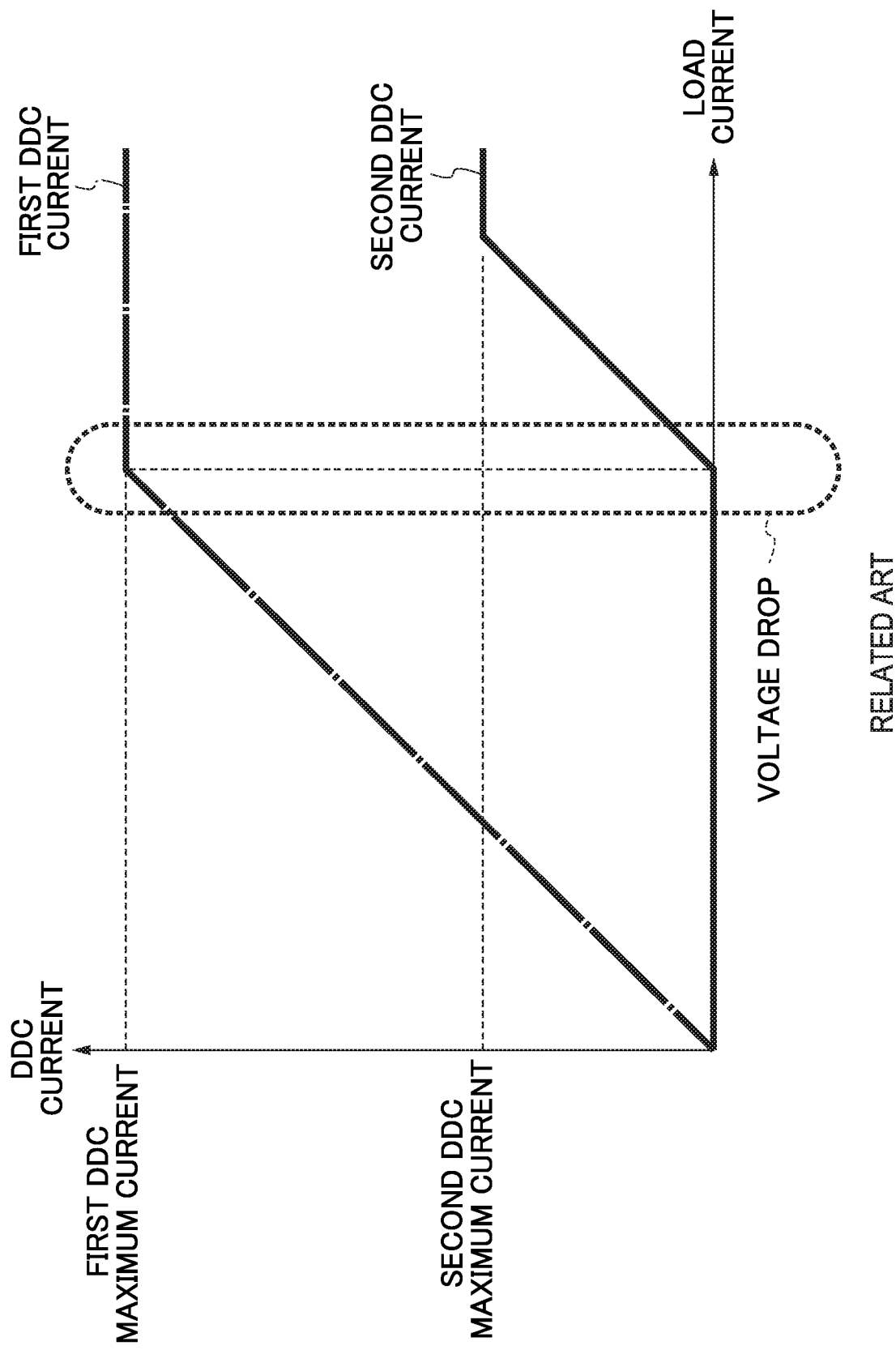

ELECTRIC POWER SUPPLYING DEVICE

CROSS-REFERENCE TO RELATED APPLICATION

This application claims priority under 35 USC 119 from Japanese Patent Application No. 2019-090043, filed on May 10, 2019, the disclosure of which is incorporated by reference herein.

BACKGROUND

Technical Field

The present disclosure relates to an electric power supplying device.

Related Art

Japanese Patent Application Laid-Open (JP-A) No. 2013-090517 discloses a technique of, in order to supply electric power to a predetermined object of supply of electric power by plural DCDC converters that are connected in parallel, controlling the output voltages of the DCDC converters to become target voltages.

In a case in which plural DCDC converters are connected in parallel, and the respective output voltages thereof are controlled so as to become target voltages, as illustrated in FIG. 7, control is carried out so as to prioritarily output current from a first DCDC converter whose output voltage is high. Further, in a case in which the load of an auxiliary device system further increases, even after the output of the first DCDC converter reaches the maximum value, sensing that the voltage of the auxiliary device system has fallen below a target value triggers control that increases the voltage instruction value to a second DCDC converter and restores the voltage of the auxiliary device system.

In this way, in a case in which plural DCDC converters are connected in parallel, and the respective output voltages thereof are controlled so as to become target voltages, in the region marked "voltage drop" in FIG. 7, a temporary drop in the voltage of the auxiliary device system arises. Accompanying this, there are cases in which malfunctions arise, such as the brightness of lamps that are loads of the auxiliary device system temporarily drops, the wiping speed of the wipers temporarily decreases, and the like.

SUMMARY

The present disclosure provides an electric power supplying device that may suppress fluctuations in voltage of an auxiliary device system.

A first aspect of the present disclosure is an electric power supplying device including: a first sensing section that senses a first output current from a first DCDC converter provided between a high-voltage system and an auxiliary device system; a second sensing section that senses a second output current from a second DCDC converter provided between the high-voltage system and the auxiliary device system; a third sensing section that senses a third output current from an auxiliary device battery connected to the auxiliary device system; and a control section that controls output of the second DCDC converter on the basis of results of sensing of output currents by the first sensing section, the second sensing section and the third sensing section.

In the first aspect of the present disclosure, output of the second DCDC converter is controlled on the basis of results of sensing of the first output current from the first DCDC converter, results of sensing of the second output current from the second DCDC converter, and results of sensing of the third output current from the auxiliary device battery. Due thereto, in the first aspect of the present disclosure, output of the second DCDC converter can be controlled on the basis of the results of sensing of output currents, in a stage before the voltage of the auxiliary device system fluctuates accompanying fluctuations in the loads of the auxiliary device system. Accordingly, the first aspect of the present disclosure may suppress the voltage of the auxiliary device system fluctuating.

In a second aspect of the present disclosure, in the first aspect, the control section may control the output of the second DCDC converter such that current is outputted from the second DCDC converter at a stage before output of the first DCDC converter reaches a maximum value.

Due thereto, the second aspect of the present disclosure may avoid the voltage of the auxiliary device system fluctuating due to the loads of the auxiliary device system fluctuating after the output of the first DCDC converter reaches the maximum value, as compared with a case in which current is made to be outputted from the second DCDC converter after the output of the first DCDC converter reaches the maximum value.

In a third aspect of the present disclosure, in the first aspect or the second aspect, the control section may control the output of the second DCDC converter such that a magnitude of the second output current is proportional to a load current value that is the sum of the first output current, the second output current and the third output current.

In the third aspect of the present disclosure, current is outputted at a constant ratio from the first DCDC converter and the second DCDC converter over all load regions. Due thereto, the third aspect of the present disclosure may operate the first DCDC converter and the second DCDC converter equally, and, for example, the difference in the amount of heat generated by first DCDC converter and the amount of heat generated by the second DCDC converter may be made to be small.

In a fourth aspect of the present disclosure, in the first aspect or the second aspect, the control section may control the output of the second DCDC converter such that a magnitude of the second output current is proportional to a value that is obtained by subtracting a predetermined value from a load current value that is the sum of the first output current, the second output current and the third output current.

In the fourth aspect of the present disclosure, in a first load region in which the load current value is less than or equal to a predetermined value, current is outputted only from the first DCDC converter. In a second load region in which the load current value exceeds the predetermined value, current is outputted from the first DCDC converter and the second DCDC converter. Due thereto, in a case in which, for example, the first DCDC converter is higher efficiency than the second DCDC converter, the fourth aspect of the present disclosure may operate the first DCDC converter prioritarily, while suppressing fluctuations in the voltage of the auxiliary device system.

In a fifth aspect of the present disclosure, in any one of the first aspect through the fourth aspect, the first DCDC converter may control output of the first DCDC converter on the basis of a target value of output voltage from the first DCDC converter inputted from the control section, and results of sensing of output voltage from the first DCDC converter.

In the fifth aspect of the present disclosure, the structure, which controls the output of the DCDC converter on the basis of the output voltage from the DCDC converter, is a general structure that is often used as an existing DCDC converter. Therefore, the electric power supplying device relating to the present disclosure can be structured by utilizing an existing DCDC converter as the first DCDC converter and by adding the second DCDC converter and the first sensing section and the like. Accordingly, the fifth aspect of the present disclosure may inexpensively structure an electric power supplying device by utilizing an existing DCDC converter.

In accordance with the above-described aspects, the electric power supplying device of the present disclosure may suppress fluctuating of the voltage of an auxiliary device system.

BRIEF DESCRIPTION OF THE DRAWINGS

Exemplary embodiments will be described in detail based on the following figures, wherein:

FIG. 7 is a graph illustrating the relationship of output currents of respective DDCs in related art.

DETAILED DESCRIPTION

Examples of exemplary embodiments of the present disclosure are described in detail hereinafter with reference to the drawings.

First Exemplary Embodiment

Figure 1:
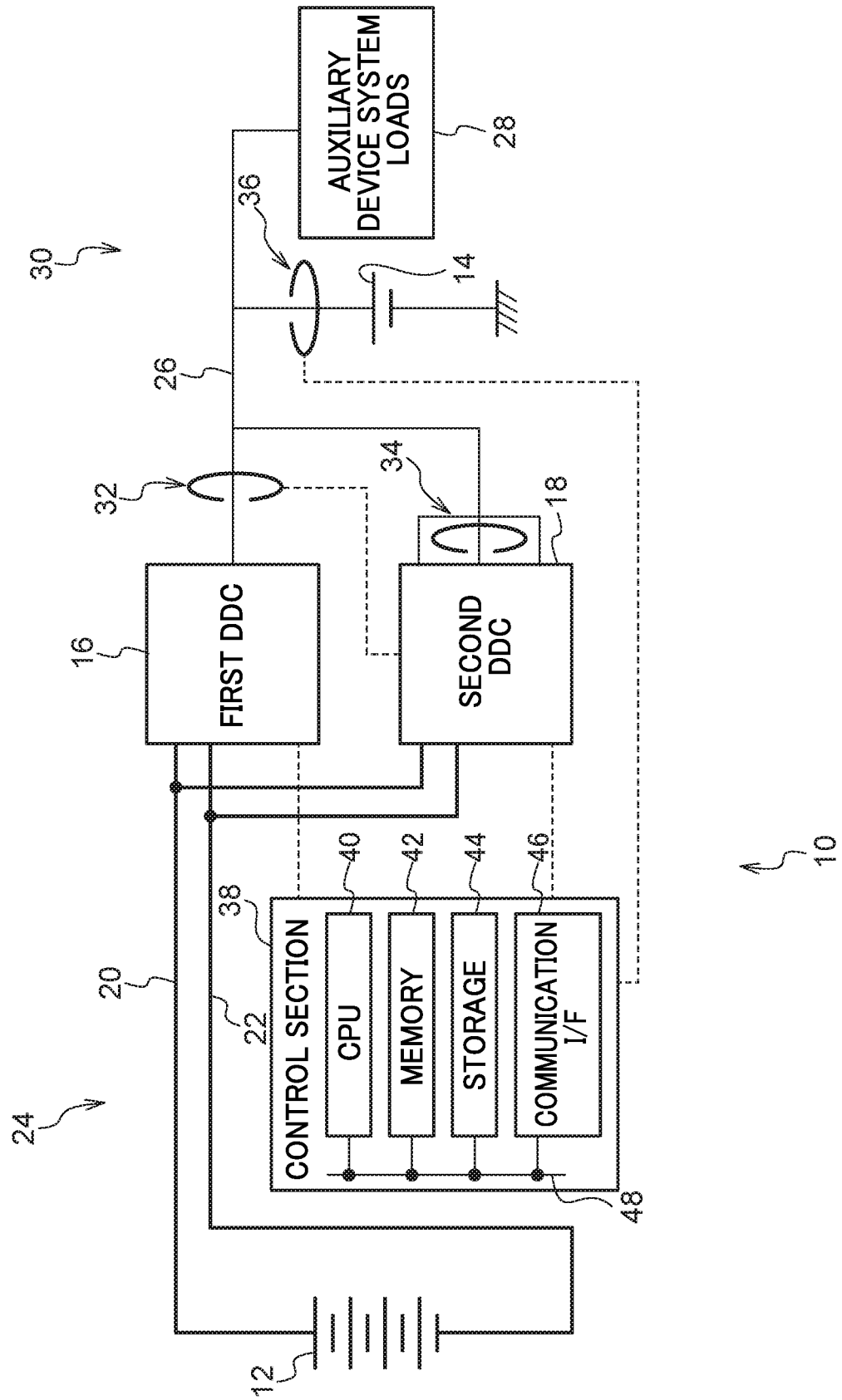
FIG. 1 is a schematic structural drawing of an electric power supplying device relating to exemplary embodiments.

An electric power supplying device 10 illustrated in FIG. 1 is installed in a vehicle. An unillustrated motor generator (hereinafter called "MG"), which operates as a motor that causes the vehicle to travel and operates as a generator, a high-voltage battery 12, and an auxiliary device battery 14 whose voltage is lower than the high-voltage battery 12 are respectively installed in the vehicle. Note that the vehicle may be an HV (Hybrid Vehicle), or may be an EV (Electric Vehicle).

The high-voltage battery 12 is connected to an unillustrated power control unit (hereinafter called "PCU"), and the MG is connected to the PCU. The PCU includes an inverter that can convert AC electric power to DC electric power, and can convert DC electric power to AC electric power. In a case in which the MG is operating as a motor, electric power is supplied from the high-voltage battery 12 via the PCU to the MG. In a case in which the MG is operating as a generator, the electric power generated at the MG is supplied via the PCU to the high-voltage battery 12, and the high-voltage battery 12 is thereby charged.

The electric power supplying device 10 includes a first DCDC converter (hereinafter, a DCDC converter is called a "DDC") 16, a second DDC 18 and a control section 38. The high-voltage sides of the first DDC 16 and the second DDC 18 are connected in parallel, and are connected to the high-voltage battery 12 via electric lines 20, 22. The high-voltage battery 12 and the electric lines 20, 22 form a high-voltage system 24 of the vehicle.

The low-voltage sides of the first DDC 16 and the second DDC 18 are connected in parallel, and the auxiliary device battery 14 and auxiliary device system loads 28 are connected thereto via an electric line 26, respectively. Examples of the auxiliary device system loads 28 are the fan that blows air toward and cools the high-voltage battery 12, the water pump that supplies cooling water to the inverter of the PCU, lighting devices such as lamps and the like, various types of actuators including the wiper motor, and the like. The auxiliary device battery 14, the auxiliary device system loads 28 and the electric line 26 form an auxiliary device system 30 of the vehicle.

Note that, in the present exemplary embodiment, the first DDC 16 is the DDC that is provided from the initial design of the vehicle, and the second DDC 18 is a DDC that is additionally provided in order to supplement the output of the first DDC 16. A first current sensor 32, which senses the output current of the first DDC 16, is additionally provided at the low-voltage side of the first DDC 16. The first current sensor 32 is connected to the second DDC 18 by a signal line. On the other hand, a second current sensor 34, which senses the output current of the low-voltage side of the second DDC 18, is built into the second DDC 18. Further, a third current sensor 36 that senses the output current of the auxiliary device battery 14 is provided between the auxiliary device battery 14 and the electric line 26.

Note that the first current sensor 32 is an example of the first sensing section, the second current sensor 34 is an example of the second sensing section, and the third current sensor 36 is an example of the third sensing section. Further, although not illustrated, a voltage sensor, which senses the output voltage of the low-voltage side of the first DDC 16, is built into the first DDC 16, and a voltage sensor, which senses the output voltage of the low-voltage side of the second DDC 18, is built into the second DDC 18.

The control section 38 includes a CPU (Central Processing Unit) 40, a memory 42 such as a ROM (Read Only Memory) or a RAM (Random Access Memory) or the like, a non-volatile storage 44 such as an HDD (Hard Disk Drive) or an SSD (Solid State Drive) or the like, and a communication I/F (Inter Face) 46. The CPU 40, the memory 42, the storage 44 and the communication I/F 46 are connected to one another via an internal bus 48.

The control section 38 is connected to the first DDC 16, the second DDC 18 and the third current sensor 36 via signal lines, respectively. In the present exemplary embodiment, the control section 38 receives, from the second DDC 18, the results of sensing of the output current of the first DDC 16 by the first current sensor 32 and the results of sensing of the output current of the second DDC 18 by the second current sensor 34, and directly receives, from the third current sensor 36, the results of sensing of the output current of the auxiliary device battery 14 by the third current sensor 36.

Operation of the present first exemplary embodiment is described next. On the basis of the temperature of the auxiliary device battery 14, or a request from another ECU (Electronic Control Unit) that is installed in the same vehicle, or the like, the control section 38 sets a target voltage value of the first DDC 16, and transmits the target voltage value that has been set to the first DDC 16. On the basis of the difference between the target voltage value received from the control section 38 and the results of sensing of the output voltage of the first DDC 16 that were detected by the voltage sensor that is built into the first DDC 16, the first DDC 16 controls the output voltage of the first DDC 16 by controlling the ON/OFF duty ratio of a switching element that is built into the first DDC 16.

On the other hand, the control section 38 carries out the following control with respect to the second DDC 18. Namely, as illustrated in FIG. 2, the control section 38 acquires, from the second DDC 18, the output current value of the first DDC 16 that was sensed detected by the first current sensor 32 and the output current value of the second DDC 18 that was sensed by the second current sensor, and acquires, from the third current sensor 36, the output current value of the auxiliary device battery 14 that was sensed by the third current sensor 36.

Figure 2:
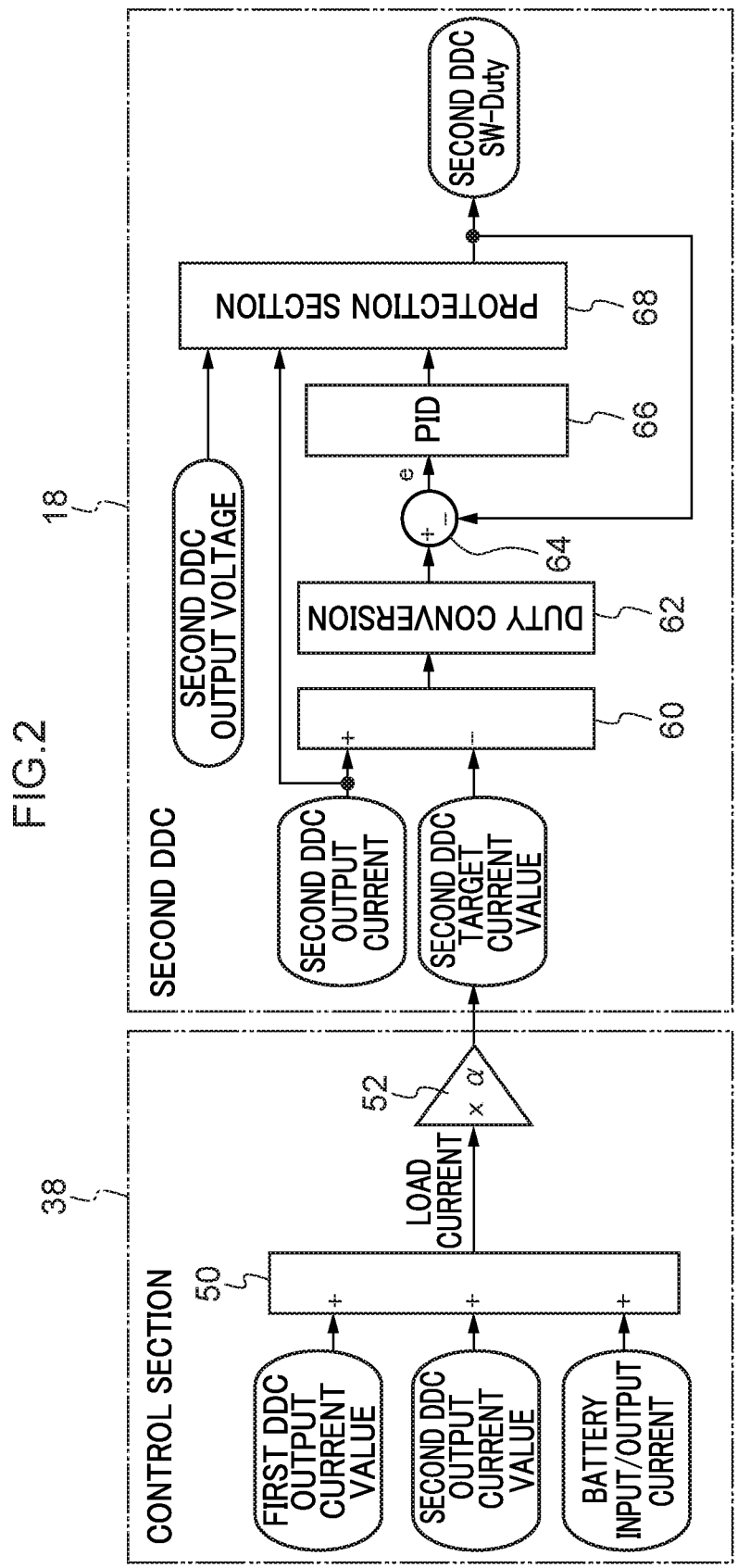
FIG. 2 is a block drawing illustrating the flow of control in a first exemplary embodiment.

Next, as illustrated as an addition section 50 in FIG. 2, the control section 38 computes, as a load current value, the sum of the output current value of the first DDC 16, the output current value of the second DDC 18, and the output current value of the auxiliary device battery 14.

Next, as illustrated as a multiplication section 52 in FIG. 2, the control section 38 multiplies the load current value by a predetermined factor α. Note that the factor α is a value that is greater than 0 and less than 1. As an example, a value, which is obtained by dividing the maximum current value of the second DDC 18 by the sum of the maximum current value of the first DDC 16 and the maximum current value of the second DDC 18, can be used as the factor α.

As illustrated in FIG. 2, the control section 38 transmits the value, which is obtained by multiplying the load current value by the factor α, to the second DDC 18 as a target current value of the second DDC 18.

As illustrated as a subtraction section 60 in FIG. 2, the second DDC 18 computes, as a current value deviation, the difference between the output current value of the second DDC 18 that was sensed by the second current sensor 34 and the target current value of the second DDC 18 that was received from the control section 38. Next, as illustrated as DUTY converting section 62 in FIG. 2, the second DDC 18 converts the current value deviation into a duty ratio (a first duty ratio).

Next, as illustrated as subtraction section 64 in FIG. 2, the second DDC 18 computes the deviation of the first duty ratio and a second duty ratio that is outputted from a PID computing section 66 illustrated in FIG. 2 via a protection section 68. Further, as illustrated as the PID computing section 66, the second DDC 18 computes the control input of the duty ratio (i.e., computes a second duty ratio) by carrying out PID (Proportional Integral Differential Control) on the basis of the deviation of the duty ratios.

Further, the second DDC 18 carries out protection function processing (the protection section 68) that limits the duty ratio, in a case in which the output voltage value of the second DDC 18 exceeds a voltage upper limit value and in a case in which the output current value of the second DDC 18 exceeds a current upper limit value. Then, on the basis of the duty ratio obtained through the protection function processing, the second DDC 18 controls the ON/OFF duty ratio of the switching element that is built into the second DDC 18, and thereby controls the output current of the second DDC 18. Due thereto, feedback control of the output current is carried out such that the deviation of the first duty ratio and the second duty ratio becomes 0.

Figure 3:
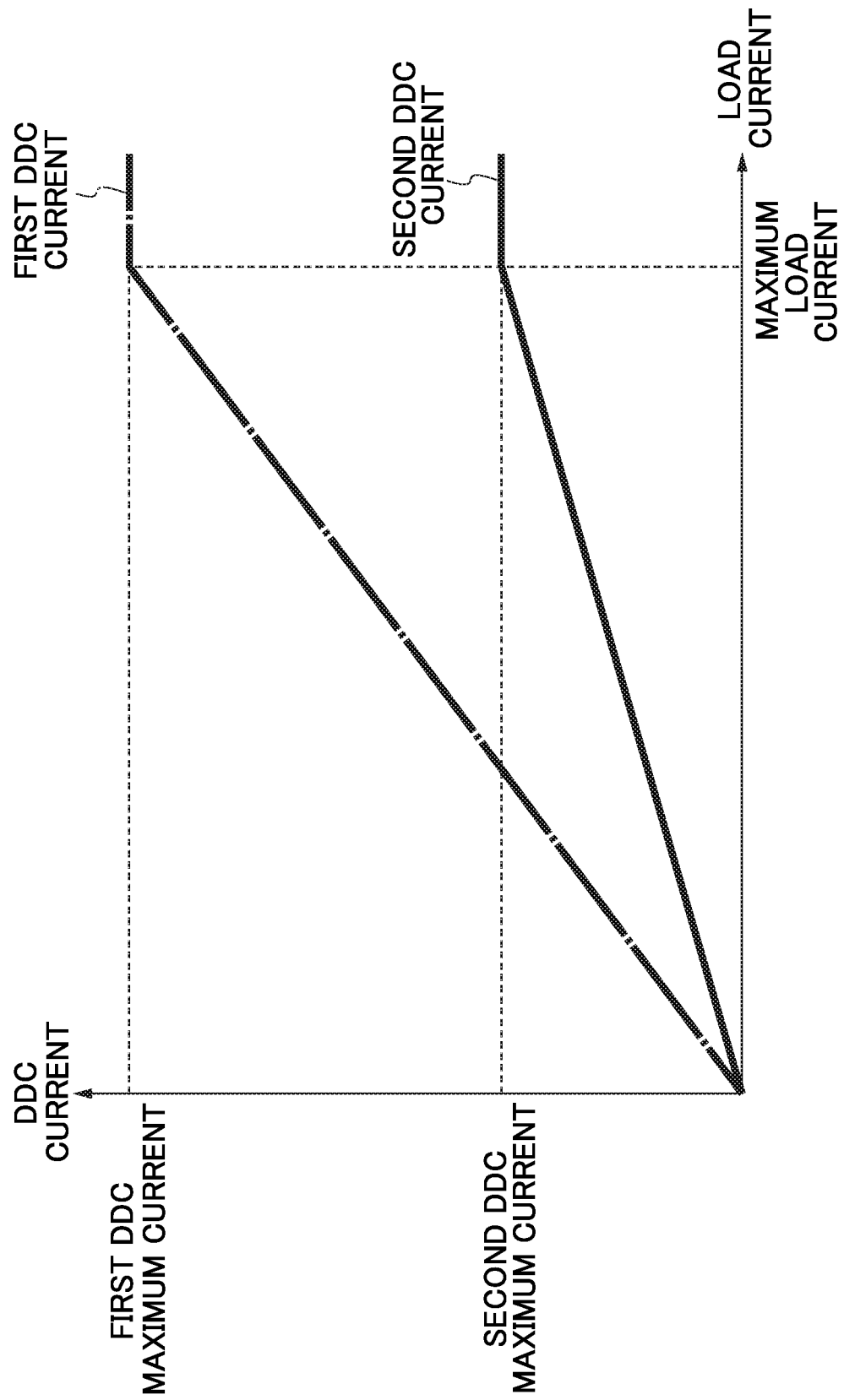
FIG. 3 is a graph illustrating the relationship of output currents of respective DDCs in the first exemplary embodiment.

The relationship between the output current of the first DDC 16 and the output current of the second DDC 18, which is obtained by the above-described control, is illustrated in FIG. 3. As illustrated in FIG. 3, in the first exemplary embodiment, the output of the second DDC 18 is controlled such that the output current of the second DDC 18 is proportional to the load current value that is the sum of the output current value of the first DDC 16, the output current value of the second DDC 18, and the output current value of the auxiliary device battery 14.

In the electric power supplying device 10 relating to the first exemplary embodiment, the first current sensor 32 senses the output current from the first DDC 16 that is provided between the high-voltage system 24 and the auxiliary device system 30, and the second current sensor 34 senses the output current from the second DDC 18 that is provided between the high-voltage system 24 and the auxiliary device system 30. Further, the third current sensor 36 senses the output current from the auxiliary device battery 14 that is connected to the auxiliary device system 30. The control section 38 controls the output of the second DDC 18 on the basis of the results of sensing of the output currents by the first current sensor 32, the second current sensor 34 and the third current sensor 36. Due thereto, at a stage before the voltage of the auxiliary device system 30 fluctuates in accordance with fluctuations in the auxiliary device system loads 28, the output of the second DDC 18 can be controlled on the basis of the results of sensing of the output currents, and therefore, the voltage of the auxiliary device system 30 fluctuating may be suppressed.

Further, in the first exemplary embodiment, the control section 38 controls the output of the second DDC 18 such that current is outputted from the second DDC 18 at a stage before the output of the first DDC 16 reaches the maximum value. Due thereto, fluctuations in the voltage of the auxiliary device system 30, due to the loads of the auxiliary device system fluctuating after the output of the first DDC 16 reaches the maximum value, may be avoided.

Further, in the first exemplary embodiment, the control section 38 controls the output of the second DDC 18 such that the magnitude of the output current from the second DDC 18 is proportional to the load current value that is the sum of the output current from the first DDC 16, the output current from the second DDC 18, and the output current from the auxiliary device battery 14. Due thereto, current is outputted at a constant ratio from the first DDC 16 and the second DDC 18 over all of the load regions, and the first DDC 16 and the second DDC 18 may be operated equally. Therefore, there difference in the amount of heat generated by the first DDC 16 and the amount of heat generated by the second DDC 18 may be made to be small.

Second Exemplary Embodiment

A second exemplary embodiment of the present disclosure is described next. Note that, because the second exemplary embodiment has the same structure as the first exemplary embodiment, the respective portions are denoted by the same reference numerals, and description of the structure is omitted.

In the second exemplary embodiment, the control section 38 carries out the following control with respect to the second DDC 18. Namely, as illustrated in FIG. 4, the control section 38 acquires, from the second DDC 18, the output current value of the first DDC 16 that was sensed by the first current sensor 32 and the output current value of the second DDC 18 that was sensed by the second current sensor 34, and acquires, from the third current sensor 36, the output current value of the auxiliary device battery 14 that was sensed by the third current sensor 36.

Figure 4:
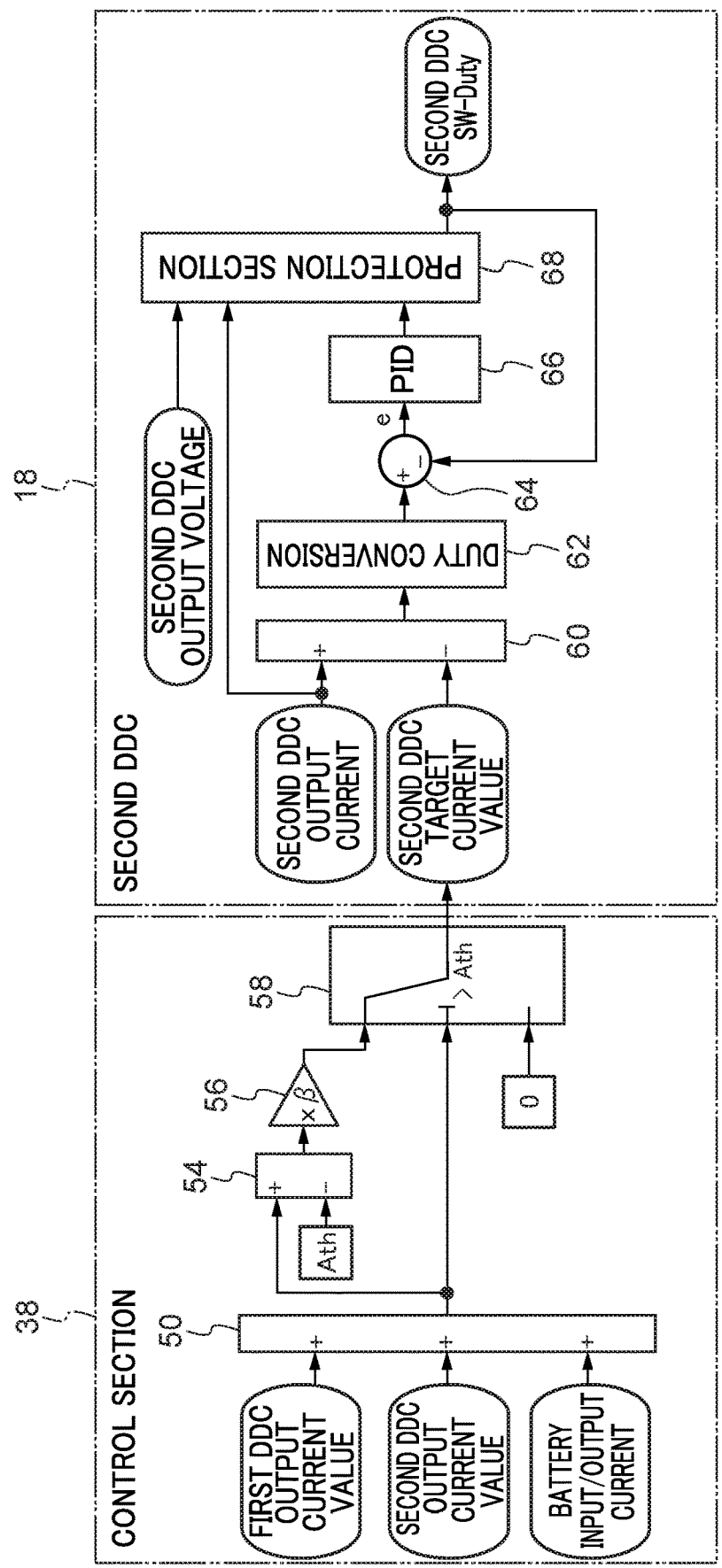
FIG. 4 is a block drawing illustrating the flow of control in a second exemplary embodiment.

Next, as illustrated as the addition section 50 in FIG. 4, the control section 38 computes, as the load current value, the sum of the output current value of the first DDC 16, the output current value of the second DDC 18 and the output current value of the auxiliary device battery 14.

Next, as illustrated as a subtraction section 54 in FIG. 4, the control section 38 subtracts threshold value current Ath from the load current value, and, as illustrated as multiplication section 56 in FIG. 4, multiplies the current value, which is obtained by subtracting the threshold value current Ath from the load current value, by a predetermined factor β. Note that the predetermined factor β is a value that is greater than 0 and is less than 1. As an example, a value, which is obtained by dividing the maximum current value of the second DDC 18 by the sum of the maximum current value of the first DDC 16 and the maximum current value of the second DDC 18, can be used as the predetermined factor β. Further, the threshold value current Ath is a value that is smaller than the maximum current value of the first DDC 16.

As illustrated as a switching section 58 in FIG. 4, in a case in which the load current value is less than or equal to the threshold value current Ath, the control section 38 transmits 0 to the second DDC 18 as the target current value of the second DDC 18. In a case in which the load current value exceeds the threshold value current Ath, the control section 38 transmits, to the second DDC 18 and as the target current value of the second DDC 18, the value that is obtained by multiplying a current value, which is obtained by subtracting the threshold value current Ath from the load current value, by the predetermined factor β. Note that, because operation of the second DDC 18 is the same as in the first exemplary embodiment, description thereof is omitted.

Figure 5:
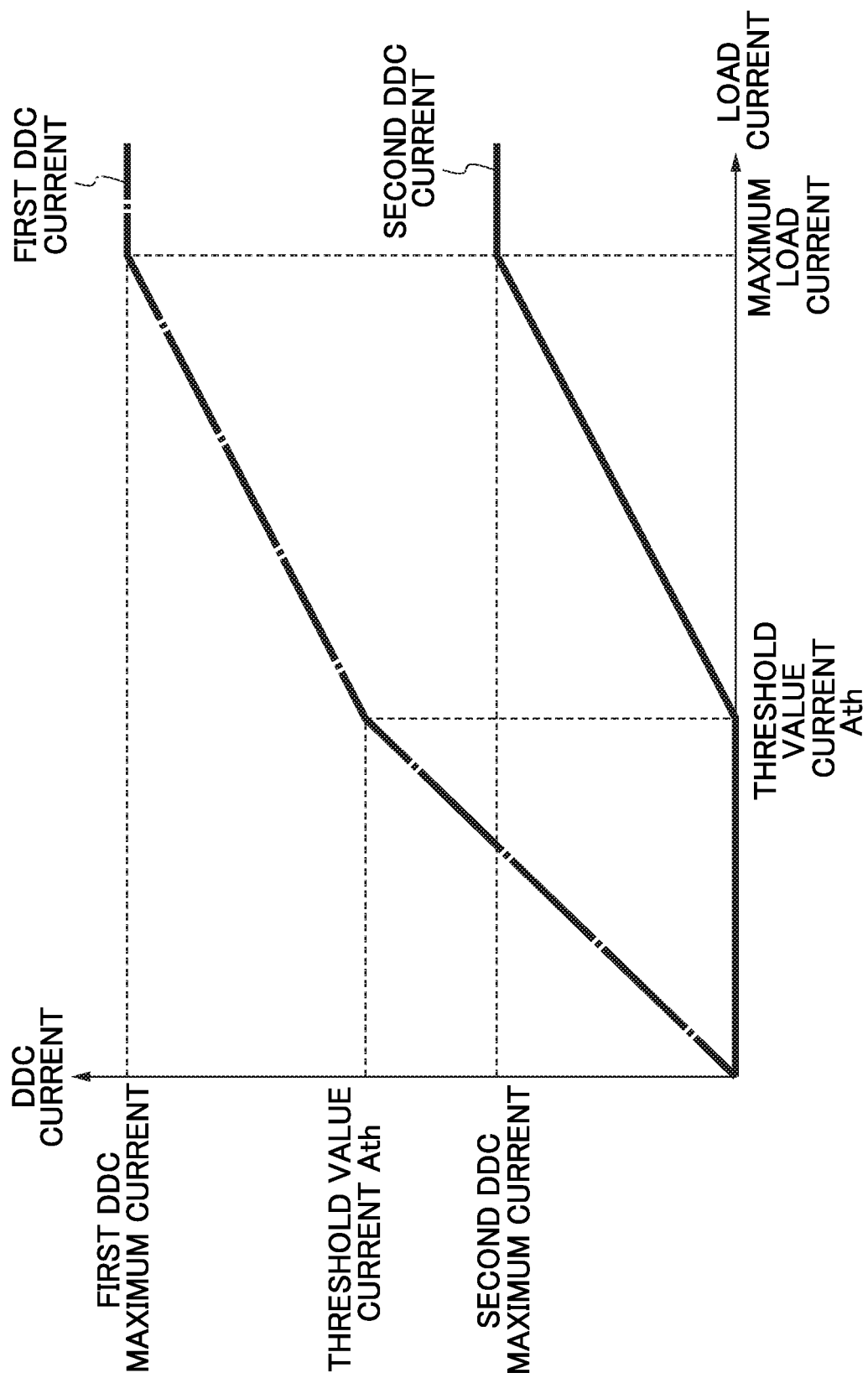
FIG. 5 is a graph illustrating the relationship of output currents of respective DDCs in the second exemplary embodiment.

The relationship between the output current of the first DDC 16 and the output current of the second DDC 18, which is obtained by the above-described control, is illustrated in FIG. 5. As illustrated in FIG. 5, in the second exemplary embodiment, the output of the second DDC 18 is controlled such that, in the load region in which the load current value is less than or equal to the threshold value current Ath, the output current of the second DDC 18 is 0, and, in the load region in which the load current value exceeds the threshold value current Ath, the output current of the second DDC 18 is proportional to the value obtained by subtracting the threshold value current Ath from the load current value.

Due thereto, in a first load region in which the load current value is less than or equal to the threshold value current Ath, current is outputted only from the first DDC 16, and, in a second load region in which the load current value exceeds the threshold value current Ath, current is outputted from the first DDC 16 and the second DDC 18. Accordingly, in a case in which, for example, the first DDC 16 is higher efficiency than the second DDC 18, or the like, the first DDC 16 may be operated prioritarily while fluctuating of the voltage of the auxiliary device system 30 may be suppressed.

Namely, the first DDC 16 is the DDC that is provided from the initial design of the vehicle, and cooling by water is often employed as the cooling method thereof. On the other hand, because the second DDC 18 is a DDC that is additionally provided, cooling by air is often employed as the cooling method thereof, and there are cases in which a general-purpose DDC that is not designed exclusively per vehicle type is employed. Therefore, in such cases, the efficiency of the second DDC is lower than that of the first DDC 16. To address this, in the second exemplary embodiment, in the low load region in which the load current value is less than or equal to the threshold value current Ath, the output of the second DDC 18 whose efficiency is low is made to be 0. Therefore, the efficiency of the electric power supplying device 10 in the low load region may be improved.

Further, also in the second exemplary embodiment, in the high load region in which the load current value exceeds the threshold value current Ath, the control section 38 controls the output of the second DDC 18 such that current is outputted from the second DDC 18 at a stage before the output of the first DDC 16 reaches the maximum value. Due thereto, the voltage of the auxiliary device system 30 fluctuating due to fluctuating of the loads of the auxiliary device system after the output of the first DDC 16 reaches the maximum value, may be avoided.

Note that, in the above, cases in which the maximum output current of the second DDC 18 is smaller than the maximum output current of the first DDC 16, as illustrated in FIG. 3 and FIG. 5, have been described. However, the present disclosure is not limited to this. For example, the maximum output current of the second DDC 18 may be the same as the maximum output current of the first DDC 16, or the maximum output current of the second DDC 18 may be greater than the maximum output current of the first DDC 16.

Figure 6:
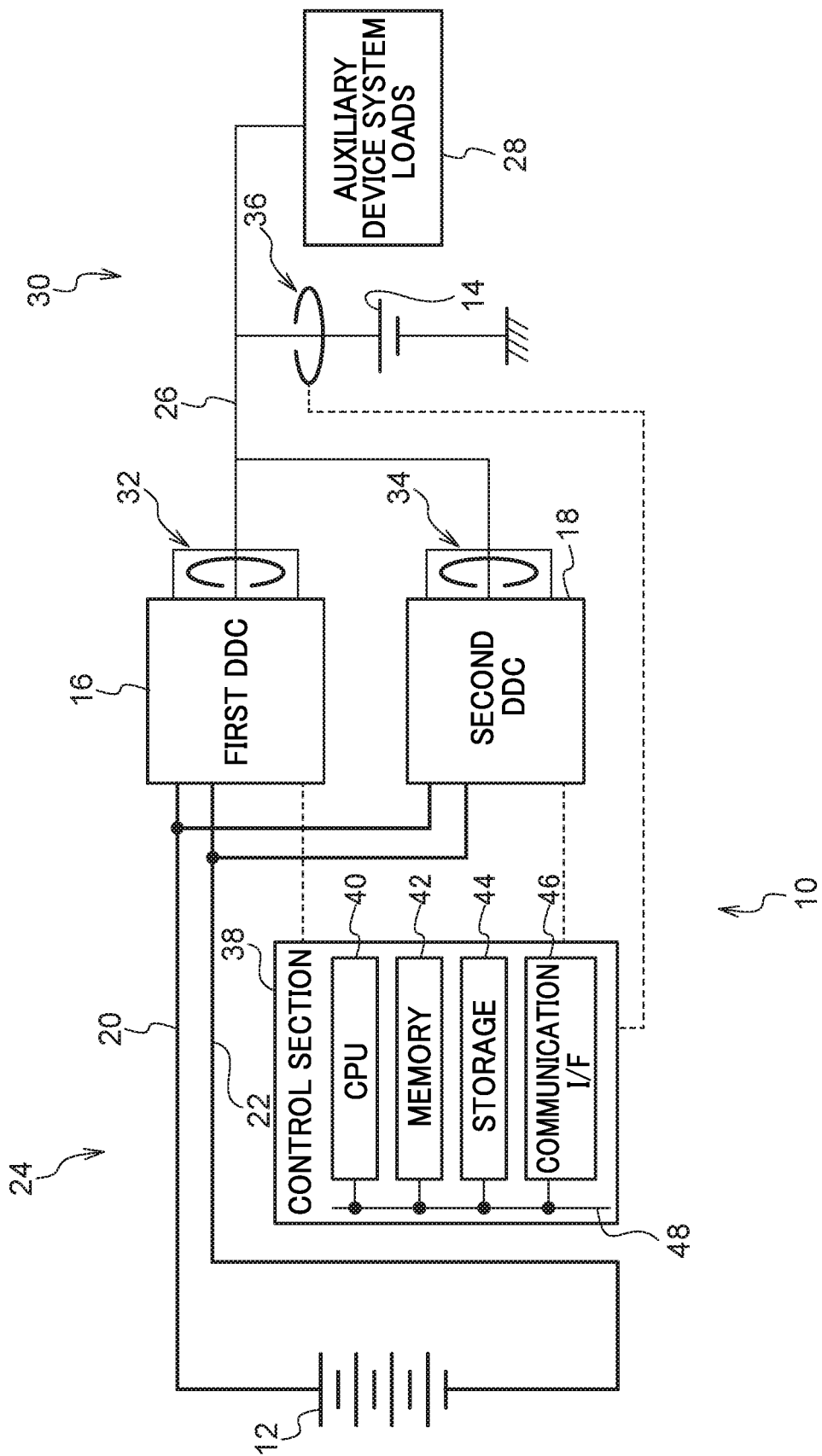
FIG. 6 is a schematic structural drawing illustrating another structure of the electric power supplying device.

Further, in the above, a case in which the first current sensor 32 is additionally provided at the low voltage side of the first DDC 16, and the results of sensing of the output current at the low voltage side of the first DDC 16 by the first current sensor 32 are outputted to the control section 38 via the second DDC 18, has been described. However, the present disclosure is not limited to this. For example, as illustrated in FIG. 6, the first current sensor 32 may be built into the first DDC 16, and the results of sensing of the output current of the first DDC 16 by the first current sensor 32 may be outputted to the control section 38 via the first DDC 16. Further, the results of sensing of output currents by the first current sensor 32 and the second current sensor 34 may be outputted from the sensors 32, 34 directly to the control section 38, in the same way as the third current sensor 36.

Further, in the above, cases in which the output current of the second DDC 18 is controlled, and, on the other hand, the output voltage of the first DDC 16 is controlled, have been described. However, the present disclosure is not limited to this, and, for the first DDC 16 as well, the output current may be controlled.

What is claimed is:
1. An electric power supplying device comprising:
a first sensing section that senses a first output current from a first DCDC converter provided between a high-voltage system and an auxiliary device system;
a second sensing section that senses a second output current from a second DCDC converter provided between the high-voltage system and the auxiliary device system;
a third sensing section that senses a third output current from an auxiliary device battery connected to the auxiliary device system; and
a control section that controls output of the second DCDC converter on the basis of results of sensing of output currents by the first sensing section, the second sensing section and the third sensing section.
2. The electric power supplying device of claim 1, wherein the control section controls the output of the second DCDC converter such that current is outputted from the second DCDC converter at a stage before output of the first DCDC converter reaches a maximum value.

3. The electric power supplying device of claim 1, wherein the control section controls the output of the second DCDC converter such that a magnitude of the second output current is proportional to a load current value that is the sum of the first output current, the second output current and the third output current.

4. The electric power supplying device of claim 1, wherein the control section controls the output of the second DCDC converter such that a magnitude of the second output current is proportional to a value that is obtained by subtracting a predetermined value from a load current value that is the sum of the first output current, the second output current and the third output current.

5. The electric power supplying device of claim 1, wherein the first DCDC converter controls output of the first DCDC converter on the basis of a target value of output voltage from the first DCDC converter inputted from the control section, and results of sensing of output voltage from the first DCDC converter.

* * * * *